(12) United States Patent
Yokoyama

(10) Patent No.: US 10,712,995 B2
(45) Date of Patent: Jul. 14, 2020

(54) DISPLAY CONTROL METHOD, STORAGE MEDIUM, AND DISPLAY CONTROL APPARATUS

(71) Applicant: CANON KABUSHIKI KAISHA, Tokyo (JP)

(72) Inventor: Tatsuyuki Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 15/970,535

(22) Filed: May 3, 2018

(65) Prior Publication Data

US 2018/0329665 A1    Nov. 15, 2018

(30) Foreign Application Priority Data

May 11, 2017    (JP) .................................. 2017-094859

(51) Int. Cl.
*G06F 3/147*    (2006.01)
*G06F 3/0489*    (2013.01)
*G06F 3/14*    (2006.01)
*G09G 5/14*    (2006.01)

(52) U.S. Cl.
CPC .......... *G06F 3/147* (2013.01); *G06F 3/04897* (2013.01); *G06F 3/1423* (2013.01); *G06F 3/1438* (2013.01); *G09G 5/14* (2013.01)

(58) Field of Classification Search
CPC ....................................................... G06F 3/147
See application file for complete search history.

(56) References Cited

U.S. PATENT DOCUMENTS

| 6,018,340 A | 1/2000 | Butler et al. |
| 2013/0132885 A1* | 5/2013 | Maynard ............. G06F 3/04883 715/777 |

FOREIGN PATENT DOCUMENTS

| JP | 4-257020 A | 9/1992 |
| JP | 2006-251465 A | 9/2006 |
| JP | 2008-116623 A | 5/2008 |
| JP | 2011-197737 A | 10/2011 |

* cited by examiner

*Primary Examiner* — Gustavo Polo
(74) *Attorney, Agent, or Firm* — Canon U.S.A., Inc. I.P. Division

(57) ABSTRACT

One or more display control methods, display control apparatuses, and storage mediums for use therewith are provided herein. A predetermined window which has been subjected to size change is disposed based on portions displayed by respective monitors in a predetermined display region and a position where the predetermined window is disposed in the predetermined display region.

20 Claims, 10 Drawing Sheets

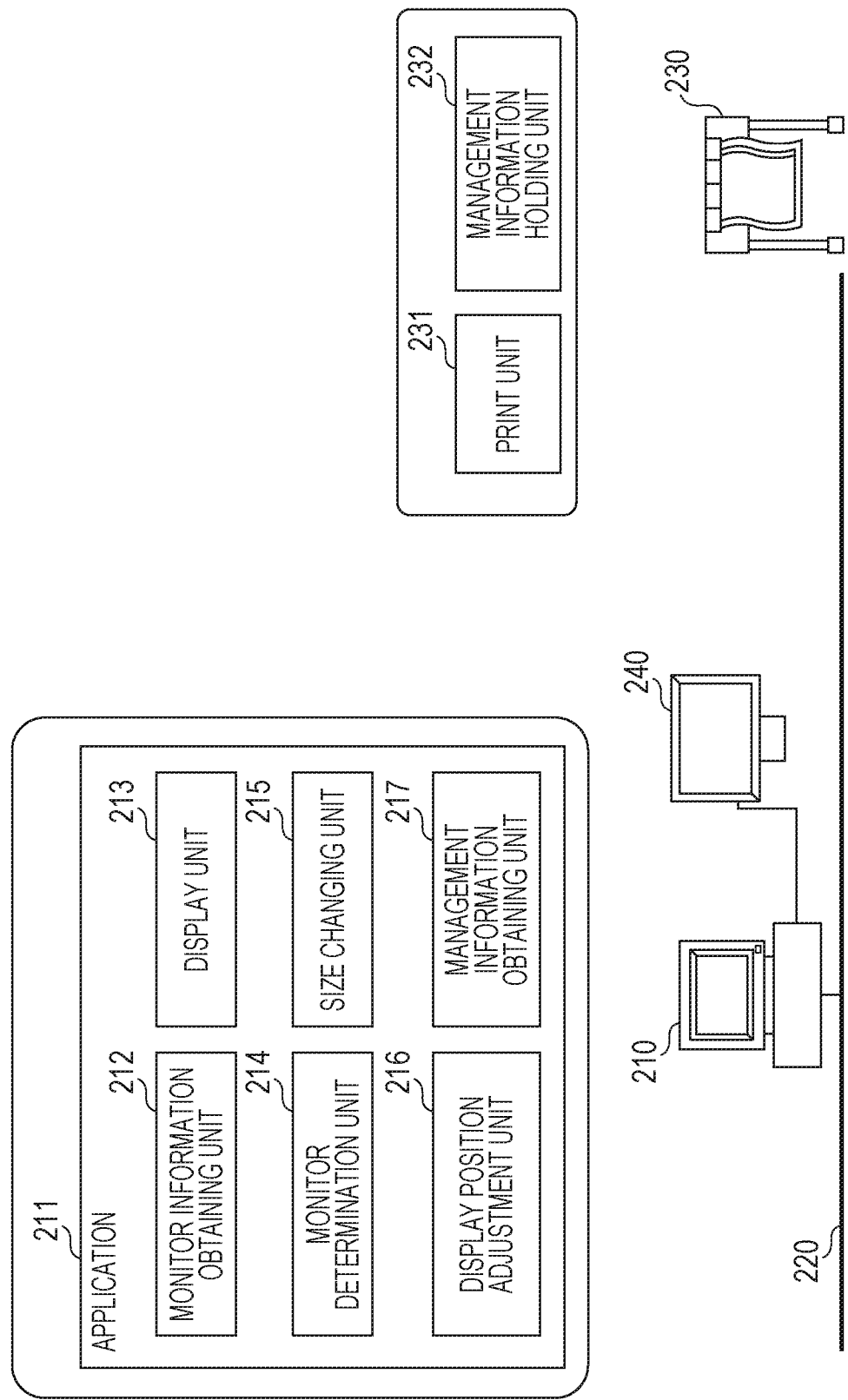

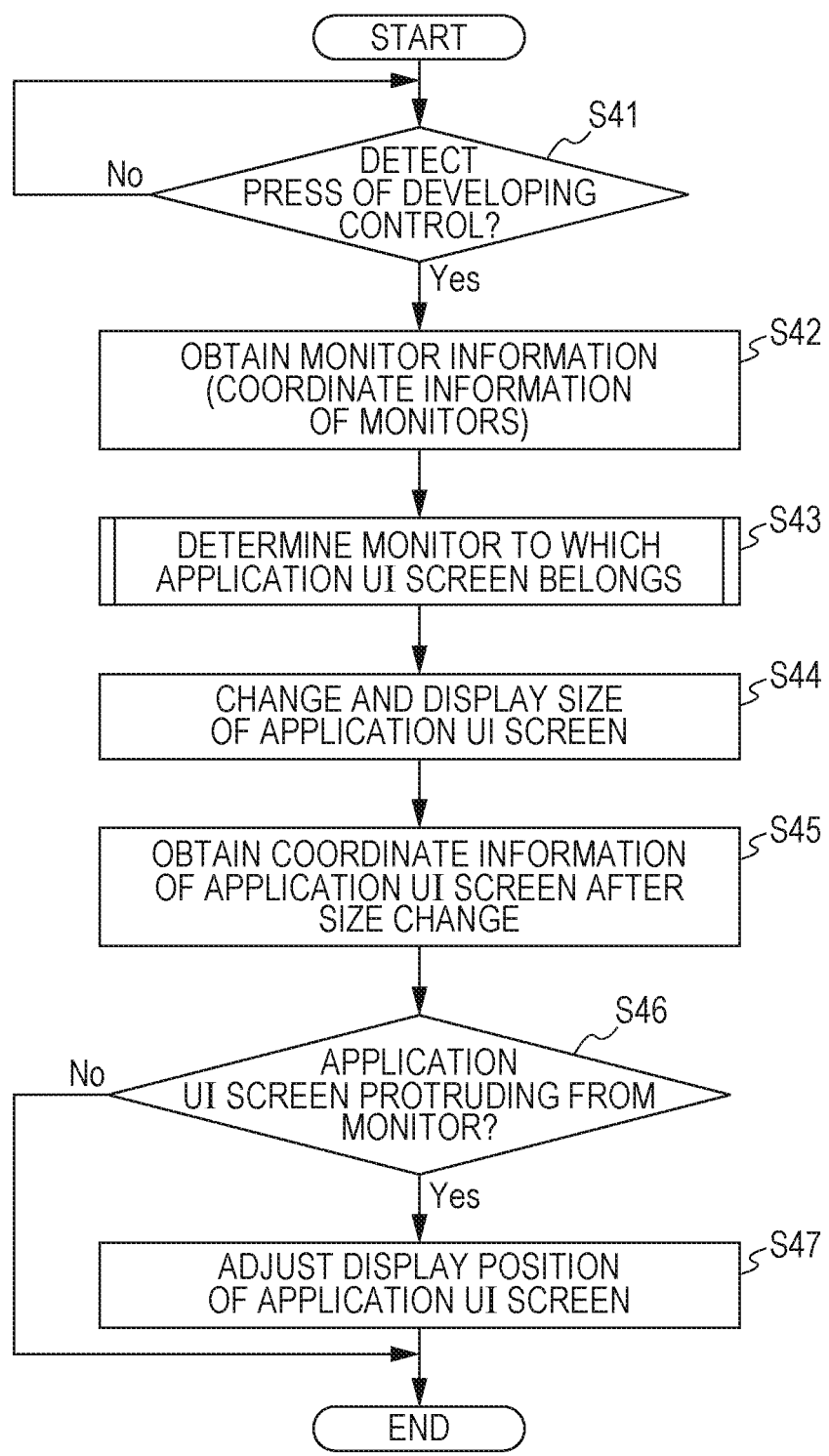

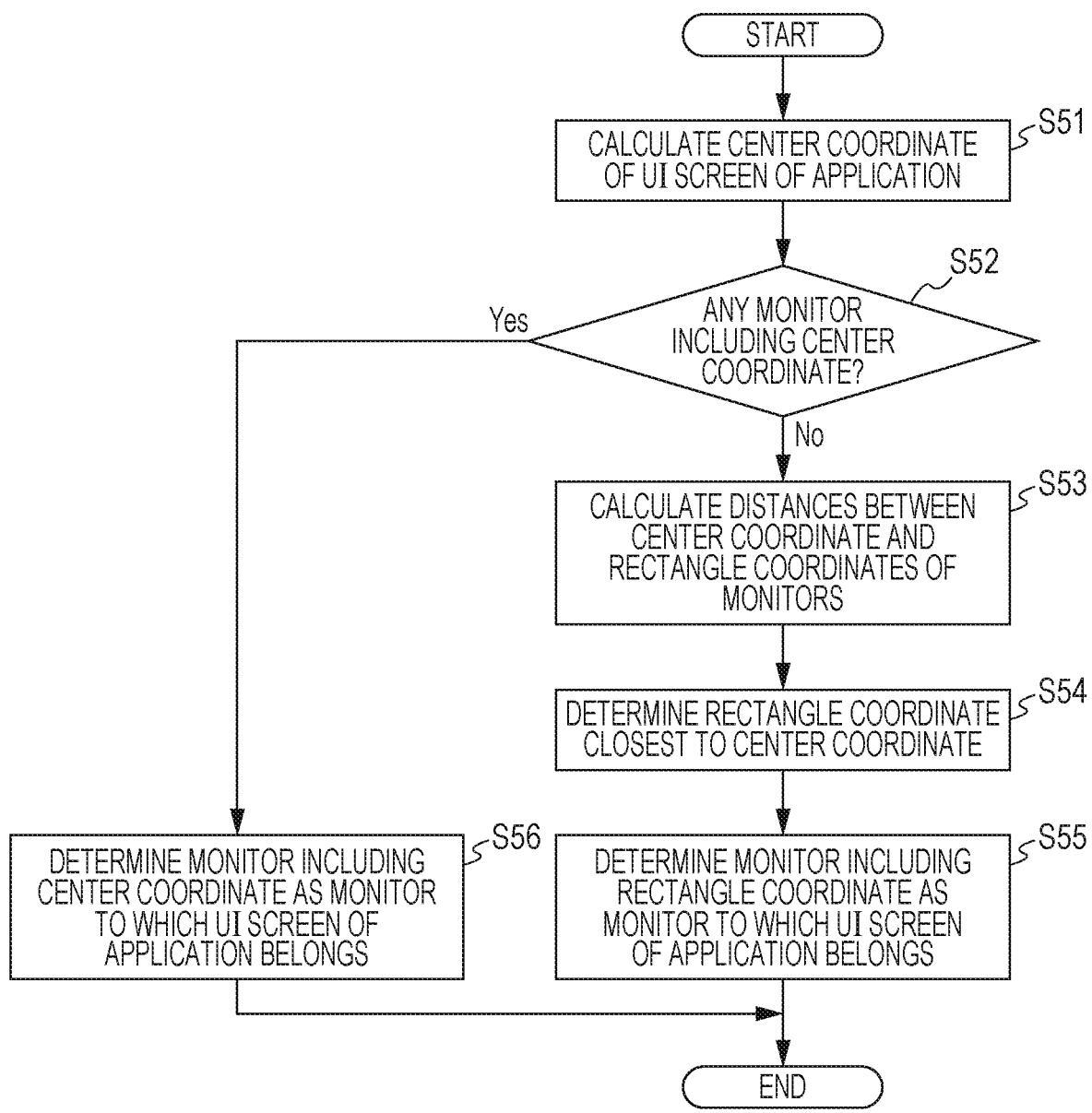

DISPLAY CONTROL METHOD, STORAGE MEDIUM, AND DISPLAY CONTROL APPARATUS

BACKGROUND OF THE INVENTION

Field of the Invention

The present disclosure relates to a technique of displaying a portion of a certain display region in a certain monitor and another portion in another monitor.

Description of the Related Art

In general, OSs which support a multi-monitor function (an extended desktop screen) for displaying a certain display region by a plurality of monitors have been used. In this multi-monitor function, a display screen is displayed by a plurality of monitors connected to a PC, that is, a larger display screen is displayed when compared with a case where the entire display screen is displayed by one monitor. Therefore, display may be performed as if a large screen is displayed by one monitor using the multi-monitor function.

Furthermore, as display control of monitors, Japanese Patent Laid-Open No. 4-257020 discloses a technique of correcting a display position of a window so that the window is displayed within a screen.

However, a multi-monitor environment is not taken into consideration in Japanese Patent Laid-Open No. 4-257020. In the multi-monitor environment, a window may be displayed across a plurality of monitors. Therefore, even if the correction of a display position is performed as described in Japanese Patent Laid-Open No. 4-257020, a window may not be displayed in a monitor desired by a user.

SUMMARY OF THE INVENTION

The present disclosure provides a technique of displaying a window in an appropriate position in a display region displayed by a plurality of monitors.

According to at least one aspect of one or more embodiments of the present disclosure, a display control method for displaying a portion of a predetermined display region in a first monitor and another portion of the predetermined display region in a second monitor includes determining a position of display of a predetermined window in the predetermined display region after a size of the predetermined window is changed, based on the portion of the predetermined display region displayed by the first monitor, the another portion of the predetermined display region displayed by the second monitor, and a position where the predetermined window is disposed in the predetermined display region, judging whether the predetermined window protrudes from a portion displayed by at least one of the first monitor and the second monitor in the predetermined display region when the size of the predetermined window is changed, and displaying at least a portion of the predetermined window after the size change in at least one of the first and second monitors so that the predetermined window which has been subjected to the size change is disposed in the determined position when it is judged that the predetermined window protrudes.

According to other aspects of the present disclosure, one or more additional display control methods, one or more display control apparatuses, and one or more storage mediums for use therewith are discussed herein. Further features of the present disclosure will become apparent from the following description of exemplary embodiments with reference to the attached drawings.

BRIEF DESCRIPTION OF THE DRAWINGS

FIG. 2 is a block diagram illustrating an example of a system configuration.

FIG. 4 is a flowchart of an example of a process of adjusting a position of the application window.

FIG. 5 is a flowchart of a process of determining a monitor to which the application window belongs.

DESCRIPTION OF THE EMBODIMENTS

Figure 1:
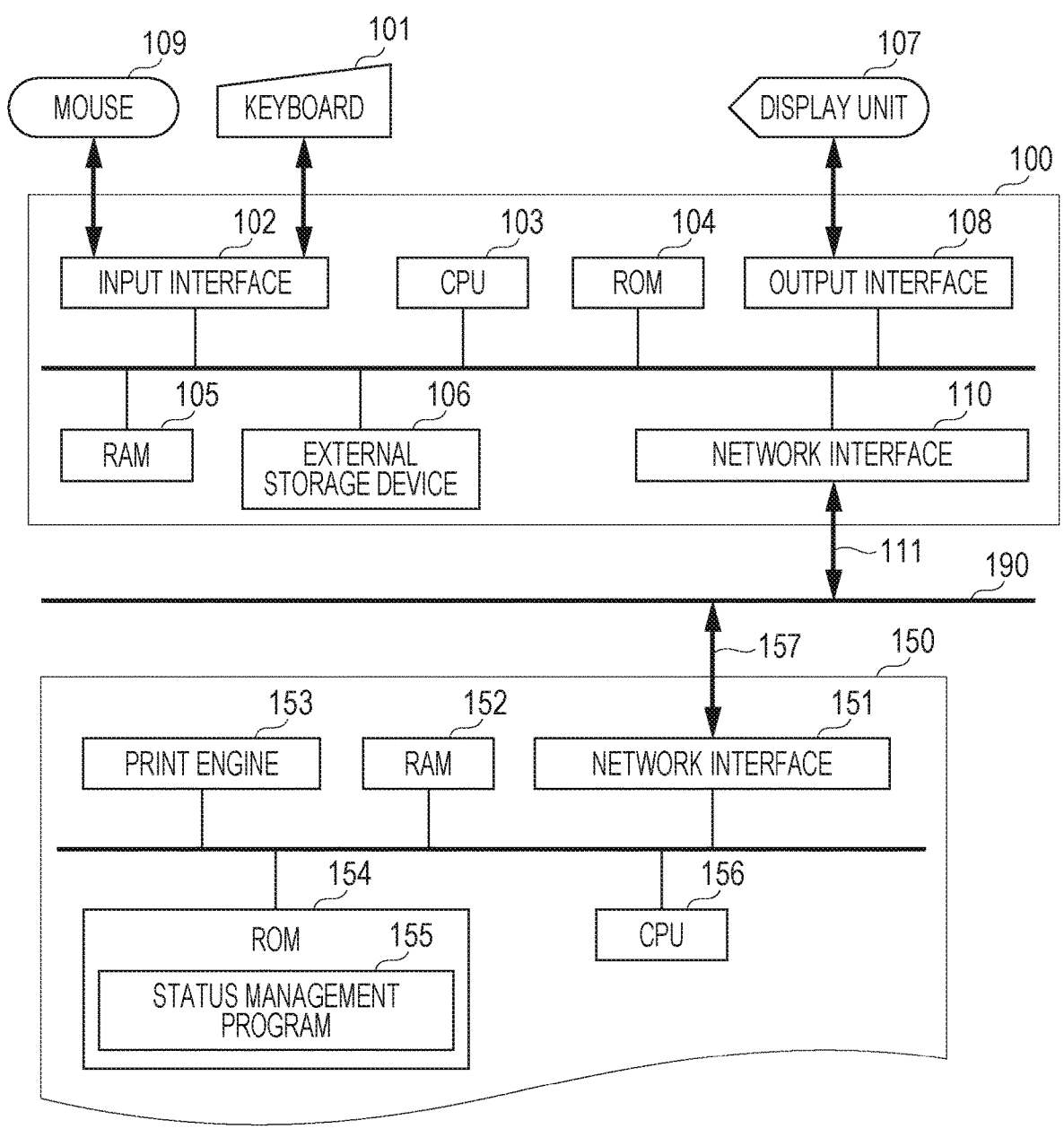
FIG. 1 is a diagram illustrating hardware configurations of a print apparatus and an information processing apparatus.

Hereinafter, at least one embodiment of the present disclosure will be described in detail with reference to the accompanying drawings. Note that the embodiment below does not limit the present disclosure according to claims, and it is not necessarily the case that all combinations of features described in the embodiments are required for achieving one or more advantages of the present disclosure.

In this embodiment, an operating system (OS) operating in an information processing apparatus provides a multi-monitor function for displaying a display region in a plurality of monitors in a divided manner. Furthermore, a user may set positions (portions of a screen of a display target to be displayed in the monitors) and resolution of monitors to be used as in a multi-monitor. The OS virtually connects screens to each other in the set positions and the set resolution so as to realize a desktop screen.

In such a window of an application operating in the multi-monitor environment, if a specific user interface (UI) controller is operated, a size of the window is changed and information to be displayed for the user is changed. As an example of such an application, an application which controls a printer which prints images will be described in this embodiment. In a window displayed by the application, status information indicating whether an error has occurred in the printer and information on consumables, such as ink, are displayed by graphical user interfaces (GUIs). In a default state of the window, only the status information of the printer is displayed and the information on consumables, such as ink, is hidden. When intending to check the consumable information, the user presses a control button in the window. In this way, the hidden information on consumables, such as ink, is additionally displayed in the window. Specifically, a size of the window is increased when the control button is pressed. Alternatively, when the status of the printer is changed, the size of the window is increased by additionally displaying information on the status in the window.

When the size of the window of the application is changed after such a specific condition is satisfied, a portion of the window may protrude to a region out of the monitors. Therefore, in this embodiment, when a portion of the window protrudes to a region out of the monitors after the size change, position adjustment of a display position of the window is performed so as to reduce an adverse effect of the protrusion. It is assumed here that the position adjustment is performed based on one of the plurality of monitors (a main monitor). In this case, if the window is displayed in the other monitor (a sub-monitor) before the size change, the window may be moved from the sub-monitor to the main monitor due to the position adjustment.

Therefore, in this embodiment, a monitor to which the window belongs, that is, the monitor which displays the window of the application before the size change in the multi-monitor environment, is automatically specified. After the window size is changed, the position of the window is adjusted based on the specified monitor. By this, degradation of visibility of the user relative to the window may be avoided when the window size of the application is changed in the multi-monitor environment. Hereinafter, a display control process according to this embodiment will be described in detail.

FIG. 1 is a diagram illustrating hardware configurations of a print apparatus and an information processing apparatus. An information processing apparatus 100 includes an input interface 102, a central processing unit (CPU) 103, a read only memory (ROM) 104, a random access memory (RAM) 105, an external storage device 106, an output interface 108, a display unit 107, a keyboard 101, a mouse 109, and a network interface 110. The network interface 110 is connected to a network 190 through a network cable 111. The ROM 104 stores an initialization program, and the external storage device 106 stores an application program group, an operating system (OS), a printer driver, and various data. The RAM 105 is used as a work memory by various programs stored in the external storage device 106. A print apparatus 150 includes a network interface 151, a RAM 152, a print engine 153, a ROM 154, and a CPU 156. The network interface 151 is connected to the network 190 through a network cable 157. The RAM 152 which is used as a main memory and a work memory of the CPU 156 stores various data and a reception buffer for temporarily storing a received print job. The print engine 153 performs printing based on data stored in the RAM 152. The ROM 154 stores various control programs including a status management program 155 and data used by the control programs. The CPU 156 controls the various units included in the print apparatus 150 in accordance with the control programs. The status management program 155 monitors a state of the print apparatus 150 based on information on various sensors, not illustrated, included in the print apparatus 150, generates status information, and stores the generated status information in the RAM 152. Although role sharing of processes between the information processing apparatus 100 and the print apparatus 150 is illustrated as described above, for example, other sharing modes may be employed instead of this sharing mode.

FIG. 2 is a block diagram illustrating an example of a system configuration which includes a personal computer (PC) 210, a network 220, a printer 230, and a display 240. The PC 210 has a configuration the same as that of the information processing apparatus 100 illustrated in FIG. 1, and the printer 230 has a configuration the same as that of the print apparatus 150 illustrated in FIG. 1. The PC 210 may transmit a print job to the printer 230 through the network 220 using a printer driver or the like. The printer 230 performs printing using a print unit 231. The printer 230 incorporates a monitor. The monitor incorporated in the PC 210 and the display 240 form a multi-monitor system. Furthermore, a plurality of displays may be disposed separately from the PC 210 and the plurality of displays may form the multi-monitor system.

An application 211 is an application program to be executed by the PC 210. Specifically, the application 211 is stored in the ROM 104 of the PC 210, and the CPU 103 reads the application 211 from the ROM 104 to the RAM 105 and executes the application 211. The application 211 includes, as program modules, a monitor information obtaining unit 212, a display unit 213, a monitor determination unit 214, a size changing unit 215, a display position adjustment unit 216, and a management information obtaining unit 217. The CPU 103 functions as the units 212 to 217 by executing the corresponding program modules. In a description below, execution of the program modules by the CPU 103 is omitted, and it is assumed that the units 212 to 217 independently perform control.

Figure 3A:
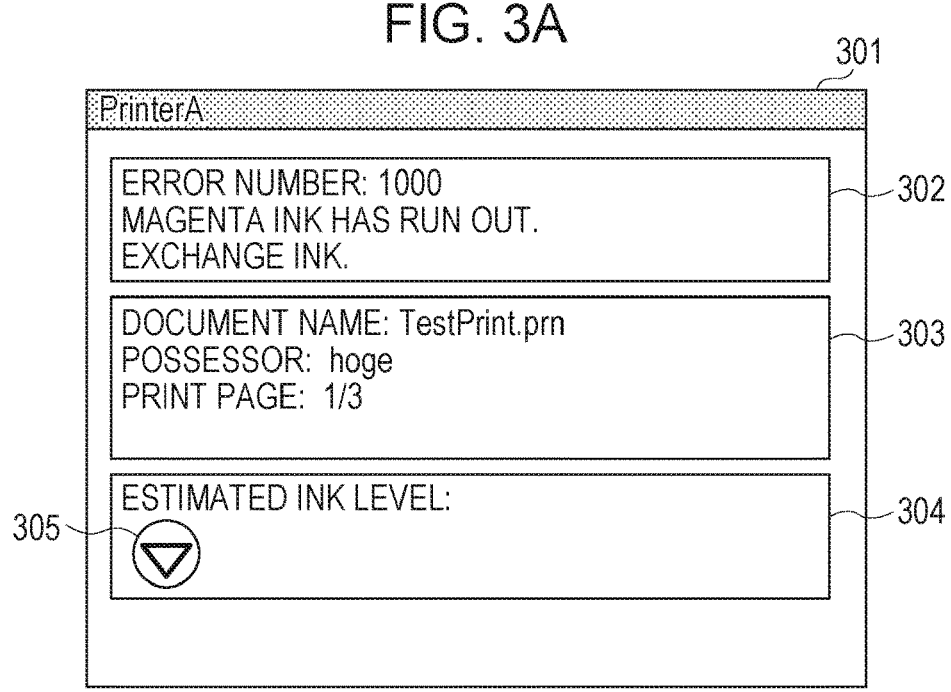
FIGS. 3A and 3B are diagrams illustrating examples of one or more displays of an application window.
Figure 3B:
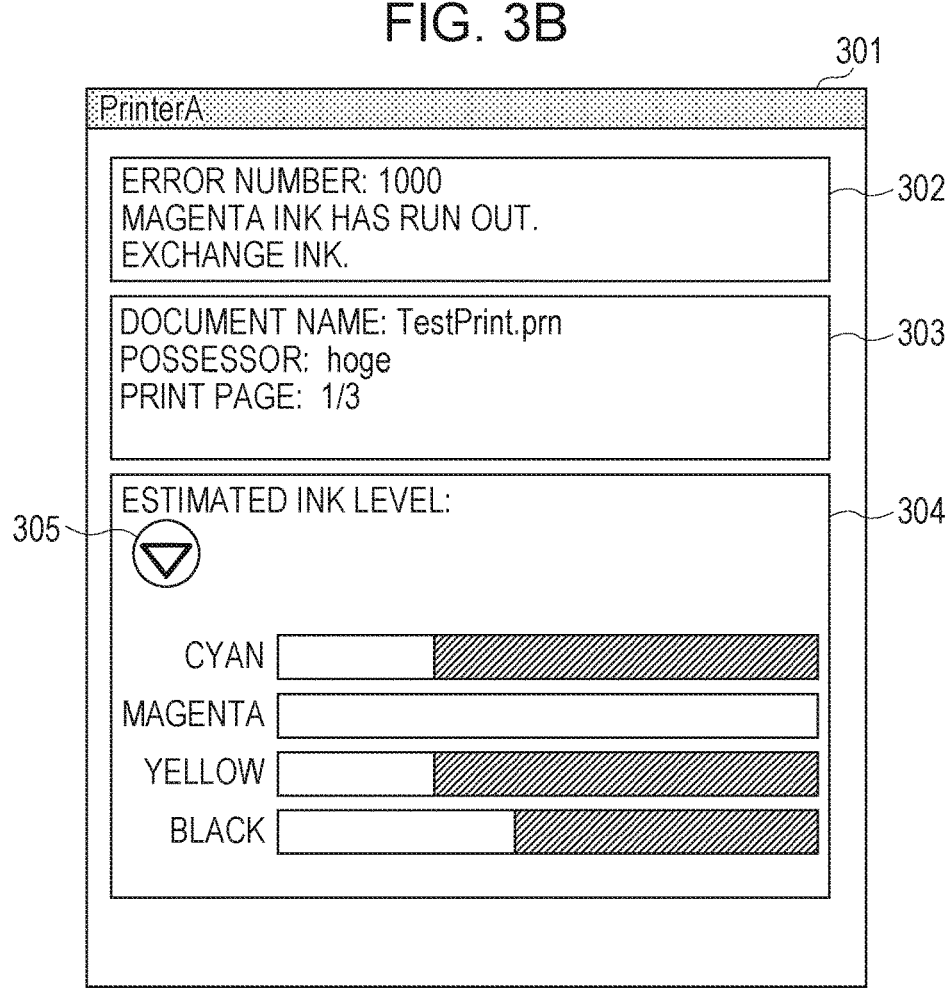

The monitor information obtaining unit 212 may obtain coordinate information of the monitors in the multi-monitor system including the PC 210 and the display 240. The display unit 213 displays a UI screen (window) of the application 211 in the multi-monitor system. The size changing unit 215 changes a size of the application UI screen (window) in accordance with a specific condition. FIGS. 3A and 3B are diagrams illustrating examples of display of an application window. In this embodiment, when the CPU 103 detects a press of a developing control button 305 illustrated in FIGS. 3A and 3B, the size changing unit 215 changes a size of the UI screen (window) of the application 211.

The monitor determination unit 214 determines a monitor to which the UI screen (window) of the application 211 belongs in the multi-monitor system. A process of the determination will be described in detail with reference to a flowchart of FIG. 5. The display position adjustment unit 216 determines whether the UI screen (window) of the application 211 protrudes from a region of the monitor to which the UI screen (window) belongs due to a size change of the UI screen (window) of the application 211. When the UI screen (window) has protruded from the region of the monitor to which the UI screen (window) of the application 211 belongs, a display position of the UI screen (window) of the application 211 is adjusted. A detailed flow of the position adjustment will be described with reference to FIG. 4.

The application 211 displays a state of the printer 230 in detail based on management information obtained by the management information obtaining unit 217 from a management information holding unit 232 of the printer 230. An example of display of the UI screen (window) will be described with reference to FIGS. 3A and 3B. In this embodiment, a configuration in which various information is obtained from the printer 230 through a network will be described. Note that the PC 210 may be connected to the printer 230 through an interface, such as a universal serial bus (USB) or the IEEE 1394, so as to perform information obtainment. Furthermore, the application 211 for displaying management information of the printer 230 is activated in the PC 210 in this embodiment. Therefore, the system configuration includes the printer 230. However, another type of device may be included in the system instead of the printer 230. Alternatively, any specific device may not be connected to the PC 210 and an application may display information on the PC 210. Furthermore, although the multi-monitor system of this embodiment includes the monitor incorporated in the PC 210 and the display 240, the multi-monitory system may include three or more monitors.

FIGS. 3A and 3B are diagrams illustrating examples of display of the UI screen (window) of the application 211 according to the first embodiment. The UI screen (window) of the application 211 includes a title bar 301, a message display section 302, a job information display section 303, an ink information display section 304, and a developing control button 305. In the title bar 301, an application name, a printer name, or the like is displayed. In the message display section 302, a message indicating a state of the printer 230 is displayed based on information obtained by the management information obtaining unit 217. In the job information display section 303, information on a print job being executed by the printer 230 is displayed based on the information obtained by the management information obtaining unit 217. In the ink information display section 304, information on ink of the printer 230 is displayed based on the information obtained by the management information obtaining unit 217. The ink information display section 304 includes the developing control button 305 disposed therein. The ink information display section 304 is in a closed state by default (in an initial state), and detailed information on ink is hidden as illustrated in FIG. 3A. Since the ink information display section 304 is displayed in the closed state, a size of the UI screen (window) of the application 211 may be suppressed to be small. When the application 211 detects a press of the developing control button 305, the ink information display section 304 is displayed in an opened state so that the detailed information on ink is displayed as illustrated in FIG. 3B. The user may check information on remaining amounts of inks using the detailed information.

FIG. 4 is a flowchart of an example of the process of adjusting a position of the application window. Programs corresponding to processes in the flow of FIG. 4 are included in the application 211, and the processes in FIG. 4 are realized when the CPU 103 of the PC 210 executes the programs. The processes in FIG. 4 are executed when the application 211 is activated. When the application 211 is activated, the UI screen (window) of the application 211 is displayed in a state in which the ink information display section 304 is closed as illustrated in FIG. 3A.

In step S41, the size changing unit 215 determines whether a press of the developing control button 305 has been detected in the UI screen (window) of the application 211 displayed in the state in which the ink information display section 304 is closed as illustrated in FIG. 3A.

Figure 6A:
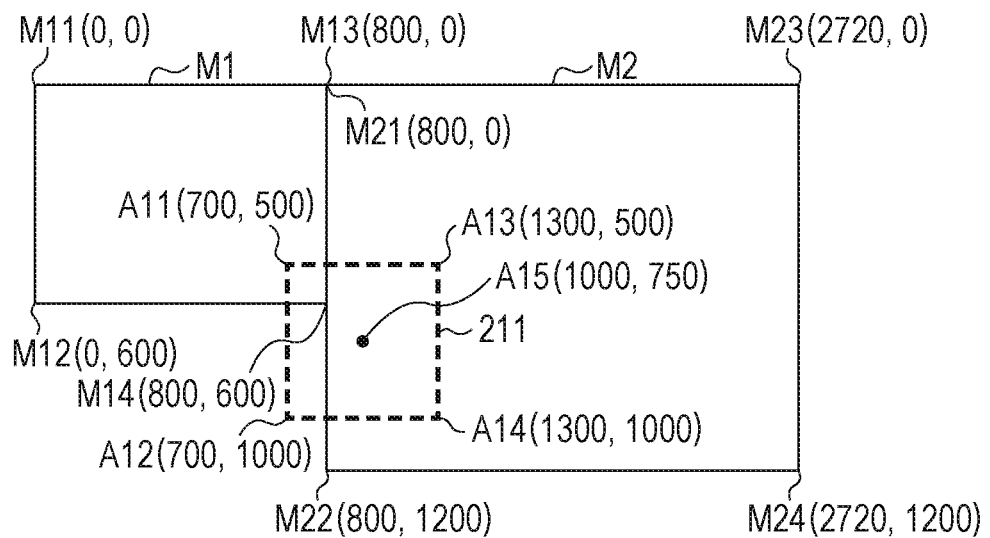
FIGS. 6A to 6D are diagrams illustrating the relationship among a display position of the application window and monitors in a multi-monitor system.

In step S42, the monitor information obtaining unit 212 obtains information on the monitors constituting the multi-monitor system. FIGS. 6A to 6D are diagrams illustrating the relationship among display positions of the application window and the monitors in the multi-monitor system. In FIGS. 6A to 6D, positions where the UI screen (window) of the application 211 is disposed in a display region displayed by the plurality of monitors are illustrated. Note that coordinates illustrated in FIGS. 6A to 6D are included in the display region displayed by the plurality of monitors. A portion of the entire screen is displayed in one of the monitors and the other portion of the entire screen is displayed in the other of the monitors. A display state before a size of the UI screen (window) is changed is illustrated in FIG. 6A. In step S42, the monitor information obtaining unit 212 obtains position coordinates of a monitor 1 (M1), a monitor 2 (M2), and the application 211 in FIG. 6A. The monitor 1 (M1) is displayed in the display of the PC 210 and the monitor 2 (M2) is displayed in the display 240. The monitor information obtaining unit 212 obtains a coordinate M11 (0, 0), a coordinate M12 (0, 600), a coordinate M13 (800, 0), and a coordinate M14 (800, 600) as position coordinates of a rectangle forming the monitor 1 (M1). The monitor information obtaining unit 212 obtains a coordinate M21 (800, 0), a coordinate M22 (800, 1200), a coordinate M23 (2720, 0), and a coordinate M24 (2720, 1200) as position coordinates of a rectangle forming the monitor 2 (M2). The monitor information obtaining unit 212 obtains a coordinate A11 (700, 500), a coordinate A12 (700, 1000), a coordinate A13 (1300, 500), and a coordinate A14 (1300, 1000) as position coordinates of the UI screen (window) of the application 211.

In step S43, the monitor determination unit 214 determines a monitor to which the UI screen (window) of the application 211 belongs based on the coordinate information of the monitors 1 and 2 and the UI screen (window) of the application 211 obtained by the monitor information obtaining unit 212. Although the determination process in step S43 is described in detail with reference to FIG. 5, one of the monitors which includes a center of the UI screen (window) or which is positioned closest to the center is specified in step S43. In an example of FIG. 6A, for example, it is determined that the UI screen (window) of the application 211 belongs to the monitor 2.

In step S44, the size changing unit 215 changes the size of the UI screen (window) of the application 211 and displays the ink information display section 304. As illustrated in FIG. 3B, the UI screen (window) of the application 211 extends in a vertical direction in response to the press of the developing control button 305 in this embodiment. Note that a method for changing the size is not limited to this and the UI screen (window) may extend in a horizontal direction or may be enlarged without changing an aspect ratio of the UI screen (window).

Figure 6B:
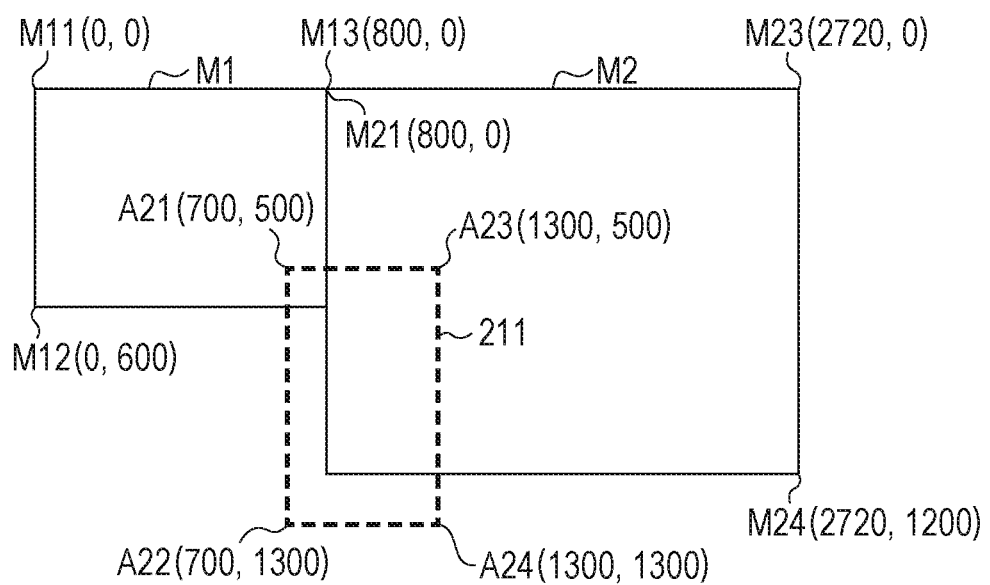

In step S45, the monitor information obtaining unit 212 obtains coordinate information of a display position of the UI screen (window) of the application 211 after the size change. In FIG. 6B, an example of the relationship among display positions of the monitors and the UI screen (window) of the application 211 in the multi-monitor system is illustrated. The monitor information obtaining unit 212 obtains position coordinates of the UI screen (window) of the application 211 in FIG. 6B. The monitor information obtaining unit 212 obtains a coordinate A21 (700, 500), a coordinate A22 (700, 1300), a coordinate A23 (1300, 500), and a coordinate A24 (1300, 1300) as position coordinates of the UI screen (window) of the application 211. Note that the UI screen in the protruding state illustrated in FIG. 6B may be displayed or may not be displayed.

In step S46, the display position adjustment unit 216 determines whether the UI screen (window) of the application 211 protrudes from a region of the monitor 2 due to the size change of the UI screen (window) based on the coordinate information obtained in step S45. When the determination is affirmative, the process proceeds to step S47. On the other hand, when the determination is negative, the display position adjustment unit 216 does not perform position adjustment on the UI screen (window) of the application 211 and the process is terminated. The coordinates obtained after change of the coordinates caused by the size change of the UI screen (window) of the application 211 are used for the determination performed in step S46. In this embodiment, as illustrated in FIGS. 3A and 3B, when the developing control button 305 is pressed, a position of a lower end of the UI screen (window) is moved downward without changing a position of an upper end so that the UI screen (window) is enlarged in the vertical direction. Therefore, in the example of FIGS. 6A to 6D, the coordinates A22 and A24 are used in the determination made in step S46. The coordinates A22 and A24 are positioned out of the region of the monitor 2 (the monitor which is determined in step S43 to be a monitor to which the UI screen belongs). Therefore, in step S46, it is determined that the UI screen (window) of the application 211 protrudes from the monitor 2.

Figure 6C:
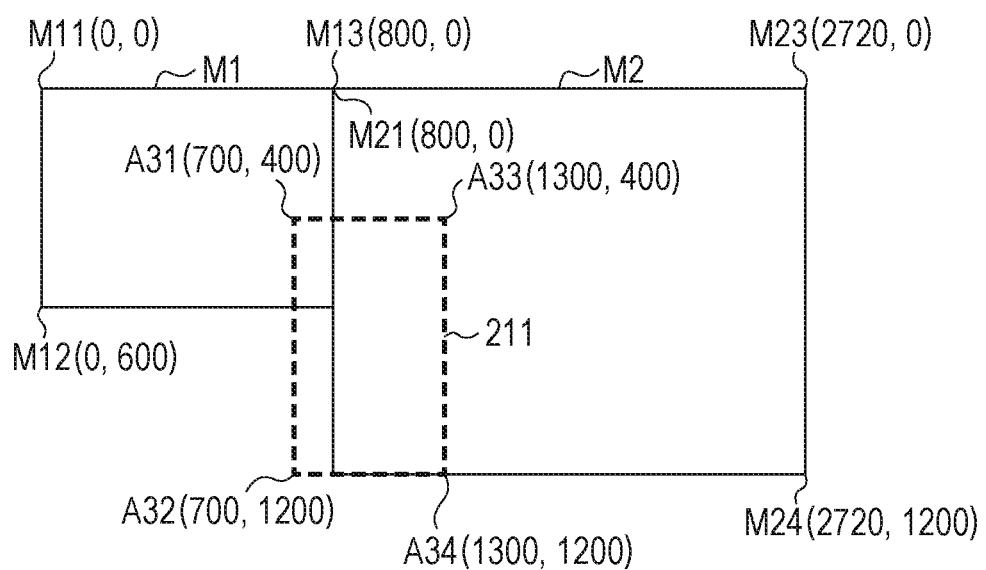

In step S47, the display position adjustment unit 216 performs position adjustment on the UI screen (window) of the application 211. Specifically, the position of the UI screen (window) is adjusted such that the UI screen (window) of the application 211 is accommodated in the region of the monitor (the UI screen (window)) specified in step S43 in a vertical direction. Therefore, position coordinates of the UI screen (window) of the application 211 after the adjustment are illustrated in FIG. 6C. Specifically, a coordinate A31 (700, 400), a coordinate A32 (700, 1200), a coordinate M33 (1300, 400), and a coordinate M34 (1300, 1200) are obtained. In this way, the position adjustment is performed such that a side corresponding to a lower end of the UI screen is in contact with a lower end of the monitor to which the UI screen belongs (the monitor 2 in FIGS. 6A to 6D). However, a certain gap may be provided between the side of the lower end of the UI screen and the lower end of the monitor to which the UI screen belongs (the monitor 2 in FIGS. 6A to 6D) instead of the case where the side of the lower end of the UI screen is in contact with the lower end of the monitor to which the UI screen belongs.

It is assumed here that the process in step S43 is not performed and position adjustment is performed based on a predetermined main monitor. In this case, if the monitor M1 is the main monitor in the example illustrated in FIGS. 6A to 6D, the position adjustment is performed such that the side of the lower end of the UI screen (window) of the application 211 matches a Y coordinate (600) of a lower end of the monitor M1. Then the UI screen (window) is considerably moved when compared with a display state before the size change illustrated in FIG. 6A, and therefore, operability and visibility for the user may be degraded.

On the other hand, the position adjustment is performed in step S47 based on the monitor to which the IU screen (window) belongs before the size change specified in step S43 as described above in this embodiment. Accordingly, an adverse effect caused by the protrusion of the UI screen (window) due to the size change may be reduced and the degradation of the operability and the visibility caused by the position adjustment may be suppressed.

Note that, when the position adjustment is performed as illustrated in FIG. 6C, the display position of the information displayed before the information is added is changed since the size change is performed. For example, a display position of the information (301 to 305) illustrated in FIG. 3A is changed as illustrated in FIG. 6C since the ink information display section 304 is additionally displayed. On the other hand, when it is determined that the protrusion of the window caused by the size change has not occurred (No in step S46), the position adjustment is not performed. Therefore, even if the position adjustment is performed as illustrated in FIG. 6C, the display position of the information displayed before the information is added is not changed. For example, a display position of the information (301 to 305) illustrated in FIG. 3A is not changed even when the ink information display section 304 is additionally displayed. Therefore, when the window does not protrude, a display position of the information displayed before the information is additionally displayed is maintained, and therefore, degradation of the visibility caused by unnecessary position adjustment may be avoided.

Note that, since the UI screen is enlarged in the vertical direction as illustrated in FIGS. 3A and 3B in the foregoing example, the position adjustment is performed only in the vertical direction but is not performed in a horizontal direction in step S47. Accordingly, the state in which a portion of the UI screen is displayed in the monitor (M1) in the display before the enlargement of the UI screen (FIG. 6A) may be maintained even after the UI screen is enlarged.

Figure 6D:
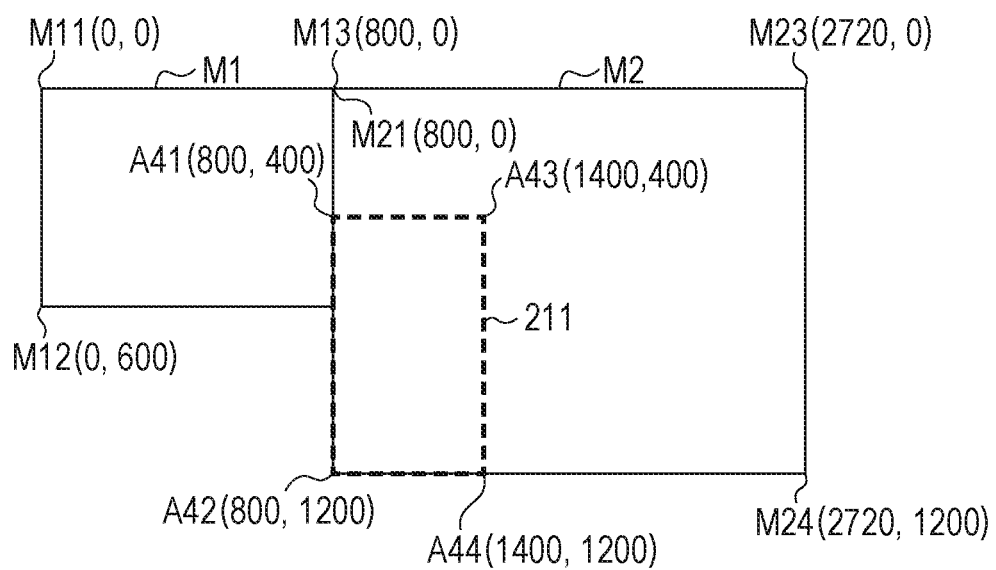

However, as another method, the position adjustment may be performed such that the entire UI screen is accommodated in the monitor to which the UI screen belongs (the monitor 2 in FIGS. 6A to 6D) as illustrated in FIG. 6D.

Furthermore, in FIGS. 6C and 6D, if the upper end of the UI screen (window) protrudes from the monitor 1 or the monitor 2, the position adjustment may not be performed and the display state illustrated in FIG. 6B may be employed. Alternatively, even if the upper end of the UI screen (window) protrudes from the monitor 1 or the monitor 2, display may be performed such that the lower end of the UI screen (window) is in contact with the lower end of the monitor 2. Specifically, in the latter case, a lower portion is preferentially displayed when compared with an upper portion of the UI screen (window) after the size change. As illustrated in FIGS. 3A and 3B, according to this embodiment, the size of the UI screen (window) is changed when information is newly added in the lower portion. In the case where the lower portion is preferentially displayed in the UI screen (window) after the size change as described above, the UI screen (window) may be displayed after the size change such that the new information is preferentially displayed for the user.

Figure 8A:
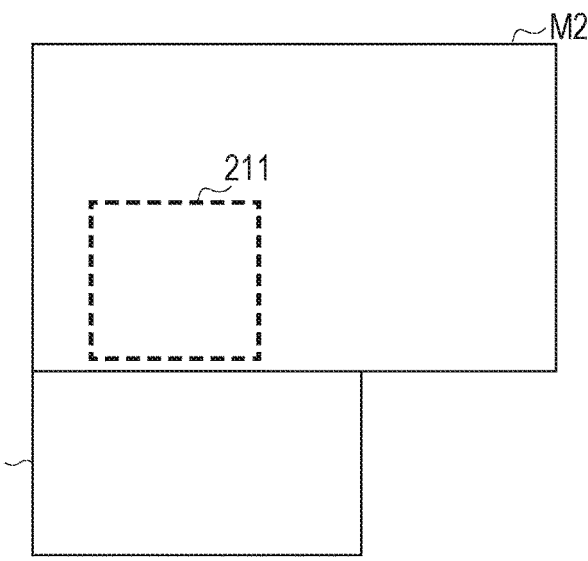
FIGS. 8A to 8C are diagrams illustrating examples of one or more displays performed when a plurality of monitors are virtually connected to each other in a vertical direction.
Figure 8B:
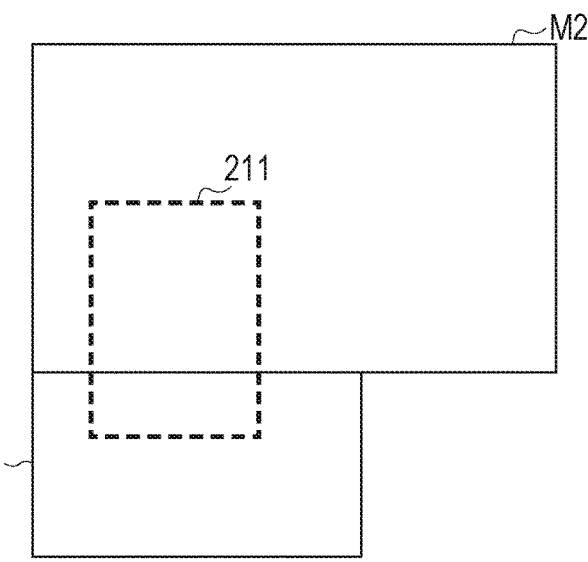
Figure 8C:
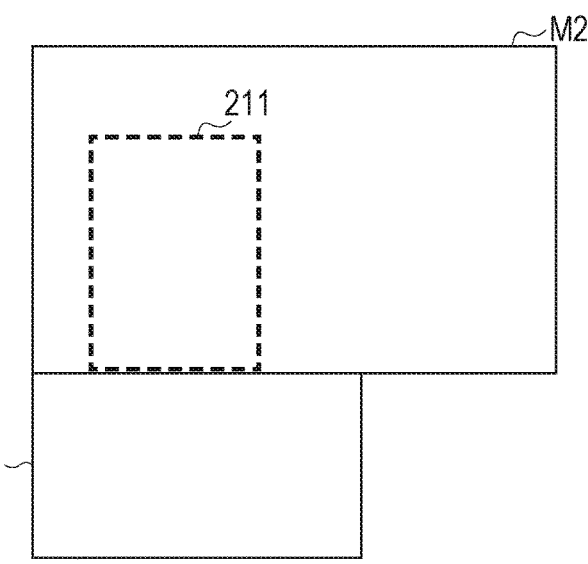

Furthermore, the display region is divided not only in the horizontal direction but also in the vertical direction by a plurality of monitors. FIGS. 8A to 8C are diagrams illustrating examples of display performed when the plurality of monitors are virtually connected to each other in the vertical direction. Note that coordinates are omitted in FIGS. 8A to 8C. In FIG. 8A, a display state before a size of the UI screen (window) is changed is illustrated. When the size is changed in this state, a portion of the UI screen (window) protrudes as illustrated in FIG. 8B. In this case, the monitor M2 is specified as the monitor to which the UI screen (window) belongs by the process in step S43. Therefore, position adjustment is performed based on the monitor M2 in the process in step S47, and therefore, a display result illustrated in FIG. 8C is obtained. Accordingly, degradation of operability and visibility caused by the position adjustment may be suppressed when compared with a case where the position adjustment is performed based on the monitor M1 serving as the main monitor. Note that the display state of FIG. 8B may be displayed by the monitors M1 and M2 in practice or the display state of FIG. 8A may be switched to the display state of FIG. 8C after the size adjustment without displaying the display state of FIG. 8B in practice. In the former case, the user may recognize that the position adjustment has been performed. On the other hand, in the latter case, the display is simply changed, and therefore, the visibility of the user may be improved. In addition, the display process associated with the display state of FIG. 8B is not required, and therefore, a processing load may be reduced. Furthermore, the case where the display illustrated in FIG. 8B is not performed is not limited to a case where a display position of the window after the size change is determined by adjusting the display position of the UI screen (window) illustrated in FIG. 8B. Specifically, the display position illustrated in FIG. 8C may be directly determined from the state illustrated in FIG. 8A based on a size of a portion displayed by the monitor to which the window belongs and a size of the window after the size change.

FIG. 5 is a flowchart of a process of determining a monitor to which the application window belongs. The flow of FIG. 5 corresponds to a detailed process in step S43 of FIG. 4.

In step S51, the monitor determination unit 214 calculates a center coordinate A15 of the UI screen (window) of the application 211 before the size change based on the position coordinates of the UI screen (window) of the application 211 obtained by the monitor information obtaining unit 212. In the example illustrated in FIG. 6A, a center coordinate A15 (1000, 750) is obtained. In step S52, the monitor determination unit 214 determines whether any of the monitors includes the center coordinate A15 obtained in step S51. In the example of FIG. 6A, since the center coordinate A15 (1000, 750) is included in the region of the monitor 2, the determination is affirmative and the process proceeds to step S56. In step S56, the monitor determination unit 214 determines that the monitor including the center coordinate A15 as a monitor to which the UI screen of the application 211 belongs. In the example of FIG. 6A, since the center coordinate A15 is included in the monitor 2, the monitor 2 is specified as the monitor to which the UI screen (window) of the application 211 belongs.

Figure 9:
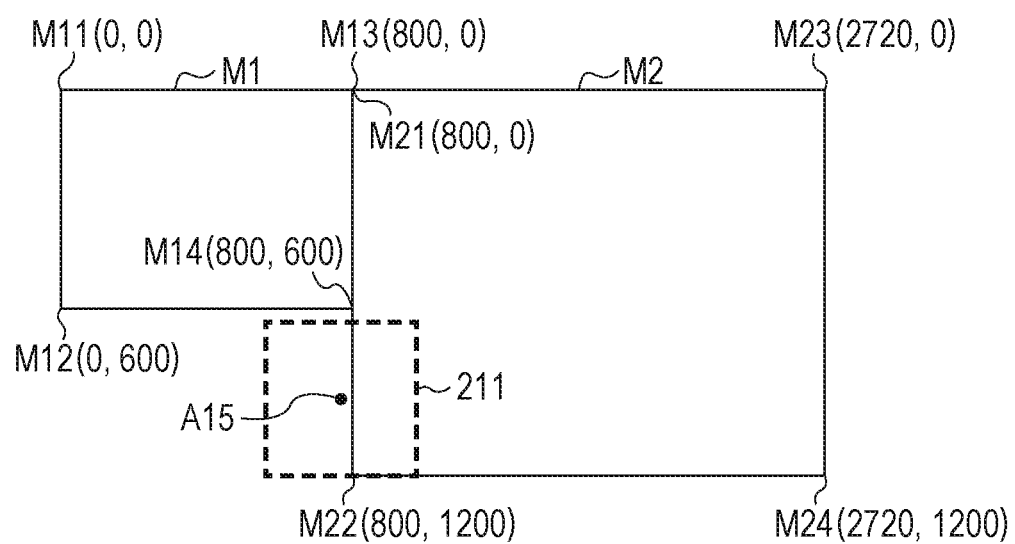
FIG. 9 is a diagram illustrating a display state when a monitor which includes a center coordinate of a UI screen does not exist before size change.

On the other hand, when the determination is negative in step S52, the process proceeds to step S53. FIG. 9 is a diagram illustrating a display state when a monitor which includes the center coordinate of the UI screen does not exist before the size change. In step S53, the monitor determination unit 214 calculates distances between the center coordinate and rectangle coordinates of the monitors. In step S54, one of the rectangle coordinates having the smallest distance to the center coordinate is determined. In a case where the determination is to be performed in FIG. 9, for example, distances between the center coordinate A15 and coordinates M11 to M14 and coordinates M21 to 24 are individually calculated. In this case, the coordinate M22 is determined as the rectangle coordinate which is closest to the center coordinate. In step S55, the monitor determination unit 214 determines that the monitor including the rectangle coordinate which is closest to the center coordinate and which is determined in step S54 as the monitor to which the UI screen (window) of the application 211 belongs.

Note that, although the determination of the monitor to which the UI screen belongs is made based on the center coordinate of the UI screen (window) of the application 211 in FIG. 5 (step S43 of FIG. 4), the determination of the monitor to which the UI screen belongs may be made based on other information. For example, one of the monitors which includes the upper left coordinate A11 of the UI screen (window) of the application 211 may be determined as the monitor to which the UI screen (window) of the application 211 belongs. Furthermore, the monitor to which the UI screen (window) of the application 211 belongs may be determined based on values of areas of the UI screen (window) of the application 211 displayed in the regions of the monitors 1 and 2.

In this embodiment, the example in which the position of the UI screen (window) of the application 211 is adjusted so that only ordinates of the UI screen (window) are accommodated in the screen region of the monitor to which the UI screen (window) of the application 211 belongs is mainly described. However, the present disclosure is not limited to this, and the position adjustment may be performed such that the entire screen of the application UI screen (window) is accommodated in the screen region of the monitor as illustrated in FIG. 6D. Furthermore, the adjustment may be performed such that only an important portion of the application UI screen (window) is accommodated in the screen. For example, the ink information display section 304 is seen to be an important portion which is additionally displayed by changing the size of the application UI screen (window). This is because it is highly possible that the user emphasizes the display of the ink information display section 304 since the user presses the developing control button 305. Therefore, the position adjustment may be performed such that the entire ink information display section 304 is accommodated in the screen. On the other hand, the title bar 301, the message display section 302, and the job information display section 303 are information displayed even before the developing control button 305 is pressed as illustrated in FIGS. 3A and 3B. Therefore, the UI screen in which all or a number of the title bar 301, the message display section 302, and the job information display section 303 are deleted and the ink information display section 304 is added in response to the press of the developing control button 305 may be displayed. In this way, the protrusion of the UI screen from the monitors may be reduced.

As described above, according to the processes of this embodiment, the appropriate position adjustment may be performed in accordance with the relationship among the monitors and the display position of the application UI screen (window) in the multi-monitor system when the size of the application UI is changed. Therefore, even if the user constitutes the multi-monitor system by various monitor arrangement, occurrence of a case where information which is important for the user is not displayed in the monitors may be reduced. Therefore, the application UI screen (window) may more reliably notify the user of more important information.

Furthermore, in the embodiment described above, the case where the size change is performed in response to a user's instruction which is a condition for changing a size of the UI screen (window) is described as an example. However, the present disclosure is not limited to this and the size change may be performed under various conditions. For example, the size of the UI screen (window) of the application 211 may be changed when a status change occurs due to an error or the like in an information apparatus, such as a printer, connected to an information processing apparatus, such as the PC 210, in which the embodiment embodies. The display position adjustment of the UI screen (window) performed when the size change is performed in this way will now be described. In the description below, a system configuration, program modules, and the like are the same as those illustrated in FIGS. 1 and 2. A detailed description of content which is the same as that of the display position adjustment process described above is omitted.

Figure 7:
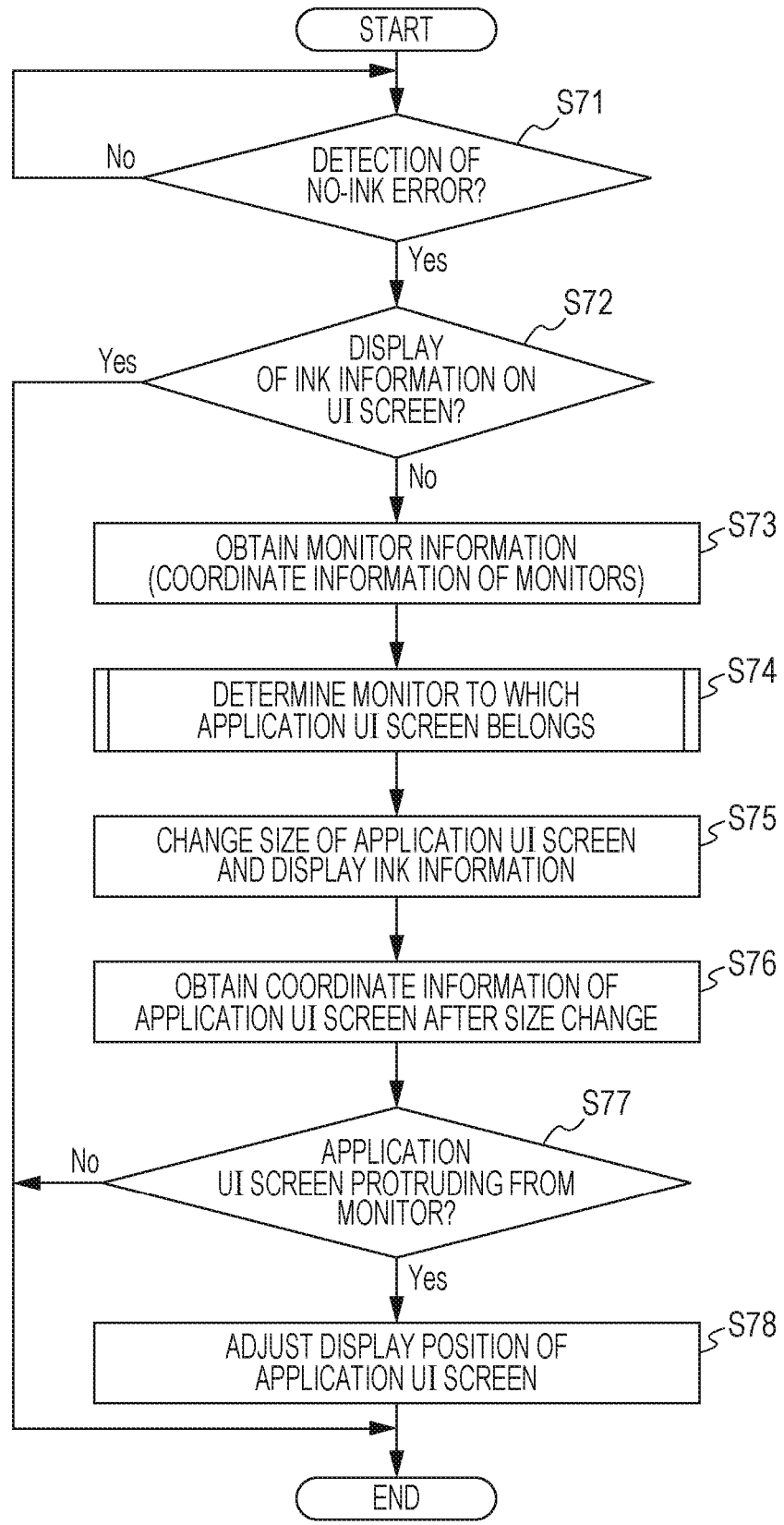
FIG. 7 is a flowchart of another example of the process of adjusting a position of the application window.

FIG. 7 is a flowchart of another example of the process of adjusting a position of the application window. Programs corresponding to processes in the flow of FIG. 7 are included in the application 211, and the processes in FIG. 7 are realized when the CPU 103 of the PC 210 executes the programs. The processes in FIG. 7 are executed when the management information obtaining unit 217 communicates with the printer 230 so as to obtain management information stored in the management information holding unit 232 in a state in which the application 211 is activated. The obtained management information includes status information of the printer 230. The status information includes information on a result of a determination as to whether an error has occurred in the printer 230 and information on a type of error if an error has occurred, for example. The management information includes information indicating a no-ink error, for example. The obtainment of the management information by the management information obtaining unit 217 may be periodically executed while the application 211 is in an active state or may be executed in response to an instruction issued by the user to the application 211. When the processes of FIG. 7 are executed, the UI screen (window) of the application 211 is displayed in a state in which the ink information display section 304 is closed as illustrated in FIG. 3A or a state in which the ink information display section 304 is opened as illustrated in FIG. 3B.

In step S71, the management information obtaining unit 217 determines whether the no-ink error has occurred in the printer 230 with reference to the status information included in the management information. In step S72, the size changing unit 215 determines whether the ink information display section 304 in an opened state is displayed in the UI screen (window) of the application 211. In a case where the ink information display section 304 is opened and an ink bar is displayed in the UI screen (window) of the application 211, the ink bar is being displayed, and therefore, the size of the UI screen (window) of the application 211 may not be changed. Therefore, the position adjustment process is terminated.

On the other hand, when the ink information display section 304 is not in the opened state (that is, the ink bar is not displayed in the UI screen (window) of the application 211), the process proceeds to step S73. In step S73, the monitor information obtaining unit 212 obtains information on the monitors constituting the multi-monitor system. The process in step S73 is the same as that in step S42 of FIG. 4. In step S74, the monitor determination unit 214 determines a monitor to which the UI screen (window) of the application 211 belongs based on the position coordinate information of the monitors 1 and 2 and the UI screen (window) of the application 211 obtained by the monitor information obtaining unit 212. The process in step S74 is the same as that in step S43 of FIG. 4, that is, the processes in FIG. 5.

In step S75, the size changing unit 215 performs the size change on the UI screen (window) of the application 211. The size changing unit 215 opens the ink information display section 304 and displays the window in which the ink bar is additionally displayed. Note that an icon or the like indicating the error may be additionally displayed in the window illustrated in FIG. 3B.

Thereafter, the process in step S76 to step S78 is the same as that in step S45 to step S47. In step S76, the monitor information obtaining unit 212 obtains coordinate information of a display position of the UI screen (window) of the application 211 after the size change. In step S77, the display position adjustment unit 216 determines whether the UI screen (window) of the application 211 protrudes from the region of the monitor 2 due to the size change of the UI screen (window). When the determination is affirmative, the process proceeds to step S78. When the determination is negative, the position adjustment of the UI screen (window) of the application 211 is not performed and the process is terminated. In step S78, the display position adjustment unit 216 performs the position adjustment such that the UI screen (window) of the application 211 is accommodated in the region of the monitor to which the UI screen (window) of the application 211 belongs which is determined in step S43. The display position adjustment unit 216 performs coordinate adjustment in the vertical direction in the monitor 2 to which the UI screen (window) of the application 211 belongs.

In the example of FIG. 7, the case where the no-ink error has occurred in the printer 230 and the size change of the application UI screen (window) is performed is described as an example. However, a type of error is not limited to this, and examples of the error type include a no-sheet error indicating that a printing sheet runs out or a sheet jam error indicating that a sheet is stuck. The examples of the error type further include an ink-low error indicating that an amount of ink becomes smaller than a predetermined remaining amount before the ink runs out. A recording material used in the printer 230 is not limited to the ink, and toner may be used.

Furthermore, as a condition for changing a size of the UI screen (window), various conditions may be set. It is assumed here that all information may not be displayed in the application UI screen (window) since communication between the PC 210 and the printer 230 is unavailable. Thereafter, the size of the UI screen (window) may be increased when the information is added to the application UI screen (window) after recovery of the communication between the PC 210 and the printer 230. Furthermore, the size of the application UI screen (window) may be changed when a setting is changed in the PC 210.

Furthermore, in the foregoing embodiment, the process of adjusting the display position of the window is performed when the application program for displaying the window is executed. However, the condition is not limited to this and the display position of the window may be adjusted by a program other than the application program for displaying the window. For example, the process of adjusting the display position of the window according to the foregoing embodiment may be performed by an OS.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094859 filed May 11, 2017, which is hereby incorporated by reference herein in its entirety.

What is claimed is:

1. A display control method executed by an apparatus which displays a portion of a predetermined display region in a first monitor and another portion of the predetermined display region in a second monitor, the display control method comprising:

changing a size of a predetermined window displayed in the predetermined display region, such that a portion for displaying information is added to the predetermined window;

determining a position, in the predetermined display region, of display of the predetermined window after the size change by the changing, based on the portion of the predetermined display region displayed by the first monitor, the another portion of the predetermined display region displayed by the second monitor, and a position of the predetermined window in the predetermined display region;

determining whether the predetermined window protrudes from a portion displayed by at least one of the first monitor and the second monitor in the predetermined display region when the size of the predetermined window is changed by the changing; and executing a process for displaying at least a portion of the predetermined window after the size change in at least one of the first and second monitors so that the predetermined window is included in the determined position, based on determining that the predetermined window protrudes.

2. The display control method according to claim 1, wherein, based on determining that the predetermined window after the size change protrudes, a position of the predetermined window after the size change is adjusted based on the portion displayed by the first monitor and the another portion displayed by the second monitor in the predetermined display region.

3. The display control method according to claim 2, wherein, when it is determined that the predetermined window protrudes, a position of display of the predetermined window after the size change is determined such that a position of display of information displayed before the addition is performed on the predetermined window.

4. The display control method according to claim 1, wherein, when it is determined that the predetermined window does not protrude, the position of the display of the predetermined window after the size change is determined such that the position of information, on the predetermined window, displayed before the addition is not changed in the predetermined display region.

5. The display control method according to claim 1, wherein, based on determining that the predetermined window protrudes, the position of the display of the predetermined window after the size change is determined such that the added new information is more preferentially displayed as a display target of the first monitor or the second monitor than information, on the predetermined window, displayed before the addition is performed.

6. The display control method according to claim 1, wherein the size of the predetermined window is changed such that a length of the predetermined window in a predetermined direction is increased.

7. The display control method according to claim 1, wherein one of the first and second monitors which includes a center of the predetermined window is specified based on the portion displayed by the first monitor, the portion displayed by the second monitor, and the position of the predetermined window in the predetermined display region, and
 a position of display of the predetermined window after the size change is determined based on the specified monitor.

8. The display control method according to claim 1, wherein the size of the predetermined window is changed in response to a user's instruction relative to the predetermined window.

9. A non-transitory storage medium which stores at least one program which causes an apparatus to execute a display control method for displaying a portion of a predetermined display region in a first monitor and another portion of the predetermined display region in a second monitor, the display control method comprising:
 changing a size of a predetermined window displayed in the predetermined display region, such that a portion for displaying information is added to the predetermined window;
 determining a position, in the predetermined display region, of display of the predetermined window after the size change by the changing, based on the portion of the predetermined display region displayed by the first monitor, the another portion of the predetermined display region displayed by the second monitor, and a position of the predetermined window in the predetermined display region;
 determining whether the predetermined window protrudes from a portion displayed by at least one of the first monitor and the second monitor in the predetermined display region when the size of the predetermined window is changed by the changing; and
 executing a process for displaying at least a portion of the predetermined window after the size change in at least one of the first and second monitors so that the predetermined window is included in the determined position, based on determining that the predetermined window protrudes.

10. The storage medium according to claim 9,
 wherein the at least one program is an application program, and
 the predetermined window is a program displayed by the application program.

11. The storage medium according to claim 10, wherein the application program displays information related to a printer which prints images.

12. The storage medium according to claim 9, wherein the predetermined window includes information related to a printer which prints images and is connected to the apparatus, and
 a size of the predetermined window is changed such that information related to a recording member to be used by the printer is added.

13. The storage medium according to claim 12,
 wherein the display control method further includes obtaining the information by communication between the apparatus and the printer.

14. An apparatus which displays a portion of a predetermined display region in a first monitor and another portion of the predetermined display region in a second monitor, the display control apparatus comprising:
 a changing unit configured to change a size of a predetermined window displayed in the predetermined display region, such that a portion for displaying information is added to the predetermined window;
 a first determination unit configured to determine a position, in the predetermined display region, of display of the predetermined window after the size change by the changing unit, based on the portion of the predetermined display region displayed by the first monitor, the another portion of the predetermined display region displayed by the second monitor, and a position of the predetermined window in the predetermined display region;
 a second determination unit configured to determine whether the predetermined window protrudes from a portion displayed by at least one of the first monitor and the second monitor in the predetermined display region when the size of the predetermined window is changed by the changing unit; and
 a display controller configured to execute a process for displaying at least a portion of the predetermined window after the size change in at least one of the first and second monitors so that the predetermined window included in the determined position, based on determining that the predetermined window protrudes.

15. The display control method according to claim 1, wherein in a case where the predetermined window protrudes before the size change is performed, and it is determined that the predetermined window protrudes when the size is changed, the predetermined window is included in the determined position.

16. The display control method according to claim 6, wherein the position of display of the predetermined window after the size change is determined, such that a position of information, on the predetermined window, displayed before the size change is changed in the predetermined direction.

17. The display control method according to claim 1, wherein the position of display of the predetermined window after the size change is determined, such that a whole of the predetermined window after the size change is displayed in any of the first monitor and the second monitor.

18. The display control method according to claim 1, wherein the predetermined window includes information related to a printer which prints images and is connected to the apparatus, and a size of the predetermined window is changed such that information related to a recording member to be used by the printer is added.

19. The display control method according to claim 18, further comprising obtaining the information by communication between the apparatus and the printer.

20. A display control method performed by executing an application program by an apparatus which displays a portion of a predetermined display region in a first monitor and another portion of the predetermined display region in a second monitor, the display control method comprising:

displaying information related to a printer which prints images, on a predetermined window;

changing a size of the predetermined window displayed in the predetermined display region;

determining a position, in the predetermined display region, of display of the predetermined window after the size change by the changing, based on the portion of the predetermined display region displayed by the first monitor, the another portion of the predetermined display region displayed by the second monitor, and a position of the predetermined window in the predetermined display region;

determining whether the predetermined window protrudes from a portion displayed by at least one of the first monitor and the second monitor in the predetermined display region when the size of the predetermined window is changed by the changing; and executing a process for displaying at least a portion of the predetermined window after the size change in at least one of the first and second monitors so that the predetermined window is included in the determined position, based on determining that the predetermined window protrudes.

* * * * *